United States Patent Office 3,462,752
Patented Aug. 19, 1969

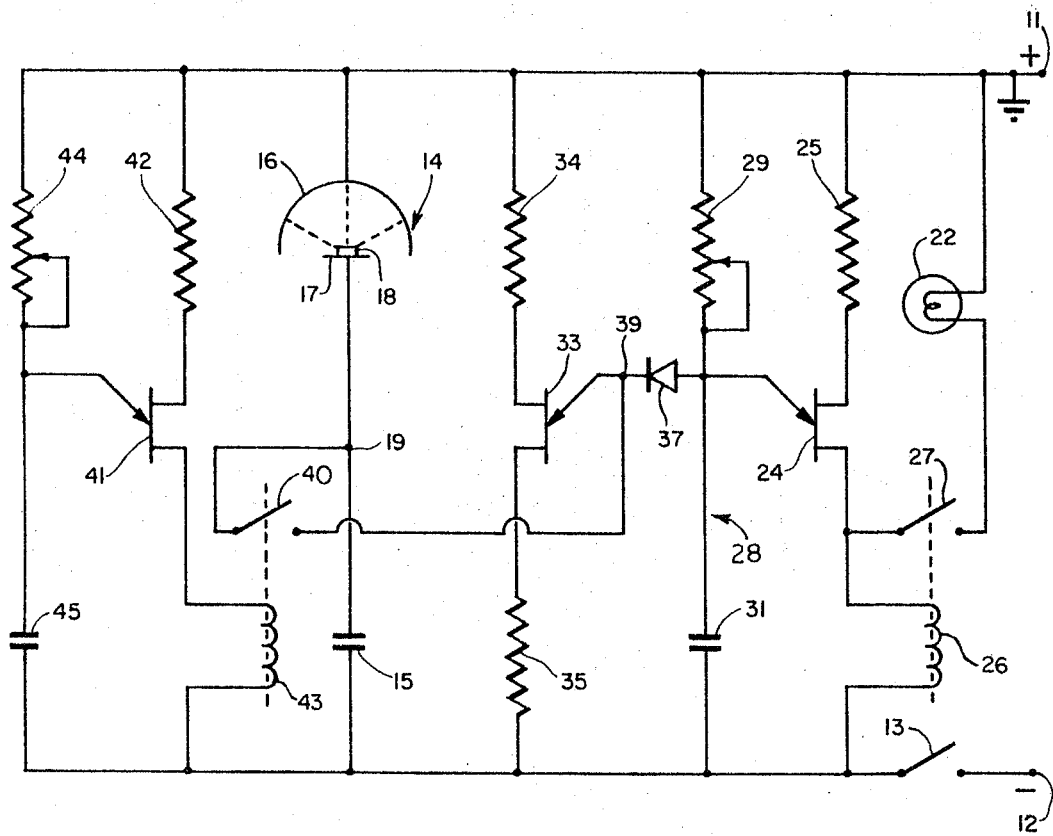

3,462,752
METHOD AND SYSTEM FOR DETECTING THE PRESENCE OF FOREIGN MATTER IN A BODY OF GAS
Donald G. Stroh, Westminster, Colo., assignor to Denver Burglar Alarm Products, Inc., Denver, Colo., a corporation of Colorado
Filed Mar. 30, 1966, Ser. No. 538,694
Int. Cl. G08b 21/00
U.S. Cl. 340—237                                        8 Claims

ABSTRACT OF THE DISCLOSURE

An apparatus and method for detecting and indicating the presence of foreign matter in a body of gas provides for the accumulation during successive equal intervals of time of charges proportional to current passing through the gas under examination. The conductivity of the body of gas is sensed by an electric potential across the body and a radioactive source for ionizing a portion of the body of gas. The charge is dissipated upon each sampling and the accumulation of a charge less than normal is employed for producing an indication of the presence of foreign matter in the gas. Very high sensitivity is obtained and the apparatus has been found particularly useful in the field of fire or combustion detection.

Detection method and system

This invention relates to detecting changes in the electric conductivity of a gas and particularly to an improved method and system for detecting the presence of products of combustion in a body of gas and which is suitable for fire detection systems and the like.

Most fire detection systems in use at the present time employ one of three general types of fire sensing elements; these are the thermostatic, the optical, and the ionized gas chamber types. These present detection systems have proved effective for a wide range of applications. Some, however, are not suited to all applications and others are expensive and are not equally applicable to all situations. Accordingly, it is an object of this invention to provide an improved fire detection system of the ionization chamber type.

It is another object of this invention to provide an improved method for detecting changes in the electric conductivity of a body of gas and the like.

It is another object of this invention to provide an improved system for detecting the presence of products of combustion in a body of gas which is highly sensitive, rugged and of simple construction.

It is still another object of my invention to provide an improved system for detecting the presence of products of combustion which is self-contained and has low voltage requirements and requires only a very small amount of radioactive material in the ionization chamber.

Briefly in carrying out the objects of this invention in one embodiment thereof a fire detection system is provided which includes a sensing element comprising a single ionized gas chamber open to the atmosphere and an alarm or indicating device connected to be operated thereby when significant products of combustion are present. The circuit of the sensing element is continuously energized and the current passing therethrough is stored or accumulated for successive equal time intervals. These intervals are determined by a first timing circuit which samples or tests periodically and continuously the amount of stored energy. A second timing circuit operating continuously at a greater time interval than the first timing circuit is employed to actuate the alarm or indicating device in the event that less than a predetermined amount of energy has been accumulated in any one of the first intervals of time. This is accomplished at the end of the first time interval by utilizing a signal derived from the stored energy for triggering a switch to disable the second timing circuit as long as a predetermined normal amount of energy has been stored. Should the presence of products of combustion in the ionization chamber reduce the current flowing through the gas ionization chamber and hence reduce the amount of energy stored in one of the first intervals of time, the alarm or indicating device is actuated at the end of the respective second time interval. The system of this embodiment which employs resistance-capacitance timing and energy storage circuits and semiconductor switch elements of the unijunction transistor type has been found to be extremely sensitive to the presence of products of combustion and highly effective in operation.

The features of novelty which characterize this invention are pointed out with particularity in the claims annexed to and forming a part of this specification. The invention itself, however, both as to its organization and method of operation, together with further objects and advantages thereof, will be best understood upon reference to the following description taken in connection with the accompanying drawing, the single figure of which is a schematic diagram of a gas conductivity device embodying the invention.

Referring now to the drawing, there is shown a circuit diagram to which is applied a direct current power source indicated by plus and minus signs at the positive and negative terminals 11 and 12, respectively, with the positive terminal connected to ground. This power source provides the power for all of the circuit components as hereinafter described and for this circuit is of the order of 10 to 20 volts. A switch 13, shown in its open position, when closed connects the power source to the circuitry as hereinafter described.

In order to detect the presence of products of combustion, a device 14 of the ionization chamber type is employed; this device includes a pair of electrodes 16 and 17 disposed in spaced relation to define an ionization zone or chamber therebetween which is open to the surrounding air or gas. Electrode 17 supports a radioactive element 18 such as a minute quantity of radium sulphate which emits a substantially steady stream of alpha particles to ionize the gas or room atmosphere present in the zone between the electrodes. When a voltage is applied across electrodes 16 and 17 a current flows therebetween.

The presence of significant products of combustion in the zone between electrodes produces a change in the conductivity of the gas between the electrodes by intercepting alpha particles and thereby reducing the amount of ionization effected by the radiation. Thus the sensing device detects the presence of the products of combustion by detecting the resulting changes in the electric current with the presence of particles of combustion. The ionization chamber thus may also be characterized as a resistance which varies with the presence of different quantities of products of combustion.

A capacitor 15 is connected in series with the detector 14 and this series circuit is connected across the input terminals 11 and 12 with electrode 16 connected to terminal 11 and the capacitor 15 connected to terminal 12 when switch 13 is closed. For the purpose of description it will be assumed that switch 13 is closed. With switch 13 closed the capacitor is charged through the detector 14 and thus stores electrical energy at a rate determined by the effective resistance of detector 14. This charge or amount of electrical energy that appears across capacitor 15 is sampled or utilized periodically for controlling an indicating means as will be described hereinafter.

A utilization device illustrated as including an electric lamp 22 functions as the indicator or alarm. Lamp 22 is arranged for actuation by a timing circuit 28 which controls a solid state or semiconductor element 24 illustrated as a unijunction transistor having a bias resistor 25 connected between one base and positive terminal 11 and a relay having a coil 26 connected between the other base of transistor 24 and the negative terminal 12. The relay includes a switch 27 which is normally open; when the switch is closed it connects lamp 22 and coil 26 in series between the lines 11 and 12 and energizes the lamp.

The timing circuit 28 includes a resistor 29 preferably of the adjustable type as illustrated and a capacitor 31 connected in series between the terminals 11 and 12. The capacitor is connected across a discharge circuit including the emitter of unijunction transistor 24 and the relay coil 26. With this arrangement the capacitor 31 starts to charge when the switch 13 is closed and upon accumulation of a sufficient charge at the end of the time period of the timer energizes coil 26 to close switch 27 and energize the lamp 22. It will be noted that closing of the switch 27 maintains energization of the coil 26 and thus the switch remains closed and the lamp energized until the switch 13 is opened.

The timing circuit 28 is controlled so that it energizes the lamp 22 only in the event that the sensing circuit including the device 14 is actuated in response to the presence of products of combustion and the like. In order to prevent operation of the timing circuit 28 under normal atmospheric conditions, a control circuit including a transistor 33 having biasing resistors 34 and 35 is connected across the terminals 11 and 12 in parallel with the timing circuit and constitutes a switching means for discharging the capacitor 31 whenever the capacitor 15 of the sensing circuit is charged to its full value during normal atmospheric conditions. The emitter of the transistor 33 is connected to the resistor 29 and the capacitor 31 through a unidirectional device illustrated as a diode 37. The voltage across the capacitor 15 is applied to the emitter of the transistor 33 through a normally open switch 40 under control of a timing circuit including a resistor 44 preferably of the adjustable type as illustrated and capacitor 45 connected in series between the terminals of the circuit and arranged to control the switch 40 in a manner described below.

This timing circuit has a time constant less than that of the timing circuit 28 and constitutes a sampling or checking device whereby the charge on the sensing capacitor 15 is applied periodically to the emitter of the transistor 33 to discharge the capacitor 31 whenever atmospheric conditions are normal. The timer operates upon a predetermined charging of the capacitor 45 to trigger a transistor 41 having a biasing resistance 42 and connected to the terminal 12 through a relay or switch operating coil 43. The capacitor is then discharged through the transistor and the coil 43 which actuates the switch 40. The switch is closed momentarily but returned to its normal position when the charge is dissipated. The closing of the switch, however, is sufficient to impress the voltage across the capacitor 15 on the emitter of the transistor 33 and, when there is a full or normal charge, discharges the capacitor 31 through the diode 37, the transistor 33 and the resistance 35. Should the charge of the capacitor 15 be insufficient to trigger the transistor 33, capacitor 31 will continue to charge through the resistance 29 and upon reaching its predetremined triggering voltage will fire the transistor 24 and close the switch 27 to energize the indicator lamp 22.

During normal atmospheric conditions in the absence of the products of combustion the operation of the circuit as described above to discharge the capacitor 31 periodically and prevent energization of the lamp 22 also discharges the capacitor 15, each capacitor being discharged through the transistor 33 and resistance 35. It will thus be apparent that the capacitor 15 is prepared for charging during the successive time interval under control of the short interval timer including the resistance 44 and the capacitor 45. Should abnormal conditions occur, the prescence of products of combustion which reduces charge of the capacitor 15 has no effect on the conductivity of the transistor 33 and the capacitor 31 continues to charge until the increased voltage across it triggers the transistor 24 to energize the coil 26 and operate the switch 27. Under these conditions it is immaterial that any charge remains in the capacitor 15 since the system is locked in indicating position, it being necessary to reset the circuit by opening the switch 13 to restore normal operating conditions after the abnormal atmosphere condition has been removed.

The operation of the above described circuit will now be explained with particular reference to its applicability in detecting the presence of products of combustion which result from a fire. Two different phases of operation will exist in the circuit depending on the surrounding atmospheric conditions which will hereinafter be referred to as the normal conditions and the abnormal conditions. The normal conditions is that existing when no significant amounts of products of combustion are present in the atmosphere, and the abnormal conditions is that existing when a fire occurs and significant quantities of products of combustion are present in the atmosphere.

When the switch 13 is closed all the timing and control circuits are energized in parallel. During normal conditions a predetermined current flows between electrodes 16 and 17 through the gas ionized by radiations from the source 18 as a result of the voltage impressed across the electrodes and this current charges capacitor 15 at a predetermined normal rate.

However, when a fire discharges products of combustion into the atmosphere in the zone between electrodes 17 and 18 the movement of the alpha particles between the electrodes 16 and 17 is impeded and the current through detector 14 is decreased and accordingly the charge stored in the capacitor 15 is reduced significantly during such abnormal conditions. Thus upon the sampling or testing of the charge on capacitor 15 either of two different signals will appear at output terminal 19 depending on the presence or absence of fire. The output signal during normal conditions comprises a voltage greater than that of the output signal when products of combustion are present. The output signal across the capacitor 15 represents the cumulative energy resulting from the passage of current through the sensing device 14 during a predetermined interval of time measured by the charging of capacitor 45. This stored energy in the capacitor 15 may be expressed as an integral of the current through the sensing device.

From the foregoing many advantages of the present invention are apparent. A device embodying the present invention requires only one ionization chamber and by utilizing the associated storage means or capacitor provides an essentially dynamic or continuous sampling operation as distinguished from the prior art "static" threshold devices such as those employing two ionization chambers.

The electric system of this invention utilizes solid state circuitry, has low voltage requirements, is fast acting, is self-contained and requires only a minute quantity of radioactive material. The system operates on a low voltage source on the order of 10 to 20 volts D.C., it may easily be constructed as a self-contained unit with all components within a small housing, and does not require a separate control panel for its operation. This system is temperature stable, is highly sensitive, and is not materially affected by normal density changes in the atmosphere.

It will thus be evident that this invention provides a system for sensing changes in the electrical conductivity of gases which is simple and effective and may be operated from low voltage supplies. By way of illustration only, and not by way of limitation, there are listed below values of circuit constants which have been found to be suitable for the illustrated circuit when emeployed as a fire alarm for the detection of the presence of combustion gases in the atmosphere of a room or other enclosure. The semiconductor devices 22, 33 and 41 were Type 2N2646 unijunction transistors. Reed-type relays were employed as the switches 27 and 40 and the sensing device comprised a pair of plate-type electrodes with a radium sulphate ionizing element having a strength of four microcuries. The circuit was operated with a 12-volt D.C. supply connected across its terminals.

Resistors:
```
    25 _____ohms__  1330
    29 _____do____   300K
    34 _____do____  1270K
    35 _____do____   180K
    42 _____do____  1270K
    44 _____do____   200K
```
Capacitors:
```
    15 _____mmfd__  100
    31 _____mfd___   47
    45 _____mfd___   47
```

Although this invention has been described in connection with a specific circuit arrangement, various other modifications and applications will occur to those skilled in the art. Therefore it is not desired that the invention be limited to the details of construction and method of operation illustrated and described.

I claim:

1. The method of detecting and indicating an increase in the presence of foreign matter in a body of gas which comprises subjecting a portion of the body of gas to radioactive energy to effect ionization thereof, impressing an electric potential across said portion to produce an electric current varying with the electric conductivity of the gas, accumulating an electric charge in accordance with the current passing through said portion, continuously sampling the amount of the electric charge stored during successive equal time intervals of predetermined duration and dissipating the charge upon each sampling, and utilizing the accumulation of a charge during one of said intervals which is less than the normal accumulated charge for indicating the presence of foreign matter in the body of gas.

2. A system for detecting and indicating an increase in the presence of foreign matter in a body of gas comprising sensing means for generating an electric current varying with the conductivity of a portion of said body of gas, means for storing an electric charge dependent upon said electric current, means for sampling periodically and continuously the electric charges stored in successive equal time intervals of predetermined duration and for dissipating each charge upon sampling, and means dependent upon the accumulation during one of said intervals of a charge less than normal for indicating an increase in the presence of foreign matter in said body of gas.

3. A system for detecting and indicating the presence of foreign matter in a body of gas as set forth in claim 2 wherein said sensing means comprises an ionization chamber exposed to the body of gas and means for ionizing a portion of the gas in said chamber.

4. A system for detecting and indicating the presence of products of combustion in a body of gas comprising a sensing means including an ionization chamber for generating an electric current varying with the conductivity of the gas in said chamber, an indicating device, means including a first timing circuit for actuating said indicating device at the end of a predetermined time interval, switching means including an actuating trigger for disabling said first timing circuit, a capacitor connected in series with said ionization chamber for storing an electric charge, means including a second timing circuit connected to be energized simultaneously with said first timing circuit for connecting said capacitor to the trigger of said switching means at the end of each of successive equal time intervals less than that of said first timing circuit and for dissipating each successive charge, said trigger being actuated in response to the storage of at least a predetermined normal electric charge in said capacitor for actuating said switching means to disable said first timing circut whereby said indicating means is actuated by said first timing circuit whenever the charge stored in said capacitor is less than said predetermined normal charge.

5. A system as set forth in claim 4 wherein said switching means is a unijunction transistor and said trigger is the control electrode thereof.

6. A system as set forth in claim 4 wherein each of said timing circuits includes a respective resistor and capacitor and including means for connecting said timing circuits across a common source of electric potential for charging said capacitors.

7. A system for detecting changes in the electric conductivity of a gaseous atmosphere including three circuits each comprising a capacitor and a resistance element connected in series, means for connecting said three circuits in parallel across a common direct current source, three normally open voltage actuated switching means each for discharging a respective one of said capacitors, the resistance element of one of said three circuits comprising a sensing device the resistance of which varies with changes in the conductivity of its ambient atmosphere, the second and third ones of said circuits and their respective ones of said switching means constituting a first timer and a second timer, respectively, and said first timer operating at a shorter time interval than said second timer, a normally open sampling switch in the connection between the capacitor of said one circuit and its respective one of said switching means, means for closing said sampling switch upon discharge of the capacitor of said first timer, the one of said switching means connected to discharge the capacitor of said one circuit being triggered only when the energy stored in the capacitor exceeds a predetermined value, unidirectional means connecting the capacitor of said second timer to the capacitor discharge switching means of said one circuit whereby both capacitors are discharged upon actuation of the switching means whereby the discharge switching means of said second timer is actuated only when the charge stored in said one circuit capacitor is below said predetermined value, a utilization device, and means dependent upon actuation of said second timer for operating said utilization device.

8. A system for detecting changes in the electric conductivity of gaseous atmosphere as set forth in claim 7 wherein said resistance element of said one circuit is of the ionized gas chamber type arranged in communication with the atmosphere to be tested and each of said switching means is a transistor of the unijunction type.

References Cited

UNITED STATES PATENTS 2,798,213    7/1957    Rowell _____ 340—253 XR
3,202,976    8/1965    Rowell.

JOHN W. CALDWELL, Primary Examiner
DANIEL K. MYER, Assistant Examiner

U.S. Cl. X.R.

250—44